(12) United States Patent
Jones et al.

(10) Patent No.: US 6,700,672 B1
(45) Date of Patent: Mar. 2, 2004

(54) ANTI-ALIASING WITH LINE SAMPLES

(75) Inventors: Thouis R. Jones, Cambridge, MA (US); Ronald N. Perry, Cambridge, MA (US); Robert M. Kotredes, Bangor, ME (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 0 days.

(21) Appl. No.: 09/364,939

(22) Filed: Jul. 30, 1999

(51) Int. Cl.$^7$ .............................. G06K 1/00; G06K 9/40; G06K 9/64; G09G 5/00; H04N 1/409
(52) U.S. Cl. .................. 358/1.1; 382/269; 382/279; 358/3.26; 358/3.27; 345/611
(58) Field of Search ................ 358/1.1, 3.26, 358/3.27; 382/275, 279, 300, 241, 269; 345/611–616, 136–137

(56) References Cited

U.S. PATENT DOCUMENTS

| | | | |
|---|---|---|---|
| 5,617,459 A | * 4/1997 | Makram-Ebeid et al. | 378/62 |
| 5,999,659 A | * 12/1999 | McCarthy et al. | 382/269 |
| 6,038,031 A | * 3/2000 | Murphy | 382/254 |
| 6,133,901 A | * 10/2000 | Law | 345/611 |
| 6,329,977 B1 | * 12/2001 | McNamara et al. | 345/589 |
| 6,424,343 B1 | * 7/2002 | Deering et al. | 345/419 |
| 2003/0210251 A1 | * 11/2003 | Brown | 345/611 |

OTHER PUBLICATIONS

Max et al.; "Antialiasing Scan–Line Data"; In *IEEE Computer Graphics and Applications*; Jan '90, pp. 18–30.

Edwin Catmull; "A Hidden–Surface Algorithm with Anti–Aliasing"; In *Proceedings from SIGGRAPH '78*; pp. 6–11.
Feibush et al.; "Synthetic Texturing Using Digital Filters"; In *Proceedings from SIGGRAPH '80*; pp. 294–301.
Kenneth Turkowski; "Anti–Aliasing through the Use of Coordinate Transformations"; In *ACM Transactions on Graphics*, vol. 1, No. 3, Jul., 1982; pp. 215–234.
Abram et al.; "Efficient Alias–Free Rendering Using Bit–Masks and Look–up Tables"; In *Proceedings from SIGGRAPH '85*; vol. 19, No. 3, Jul., 1985; pp. 53–59.
Tom Duff; "Polygon Scan Conversion by Extract Convolution"; In *Raster Imaging and Digital Typography: Proceedings of the International Conference*; Eds. J. Andre and Roger Hersch, Cambridge University Press; Oct. '89, pp. 154–168.

(List continued on next page.)

*Primary Examiner*—Kimberly Williams
*Assistant Examiner*—Melanie Vida
(74) *Attorney, Agent, or Firm*—Dirk Brinkman; Andrew Curtin

(57) ABSTRACT

A method, using a filter function, generates an anti-aliased discrete image from a continuous image including an edge. The method defines a line sample. A progressive convolution is derived from the filter function and the line sample. A pixel at a predetermined location in the discrete image is selected, and the line sample is oriented with respect to the selected pixel. A distance is measured from a point in the continuous image corresponding to the selected pixel to the edge along the oriented the line sample. The progressive convolution is evaluated at the measured distance to produce a weighted coverage value, and the weighted coverage value is associated with the pixel to anti-alias the pixel in the discrete image.

23 Claims, 12 Drawing Sheets

OTHER PUBLICATIONS

Guenter et al.; "Quadrature Prefiltering for High Quality Antialiasing"; In ACM Transactions on Graphics, vol. 15, No. 4, Oct. '96, pp. 332–353.

Juan Pineda; "A Parallel Algorithm for Polygon Rasterization" In *Computer Graphics*, vol. 22, No. 4, Aug. '88; pp. 17–20.

Michael D. McCool; "Analytic Antialiasing with Prism Splines"; In *Proceedings from SIGGRAPH '95*; pp. 429–436.

Joy et al.; Chapter 8: Antialiasing, Tutorial: Computer Graphics: Image Synthesis, The Computer Society, 1988; pp. 265–268.

* cited by examiner

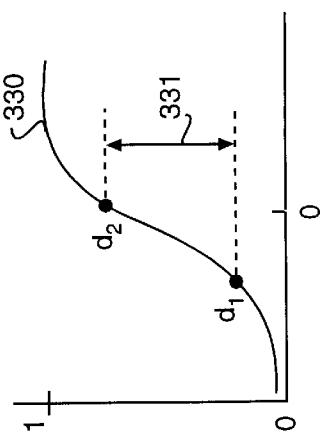
FIG. 3c
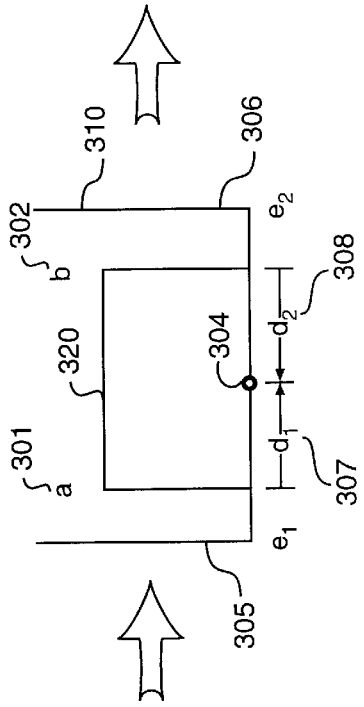
FIG. 3b
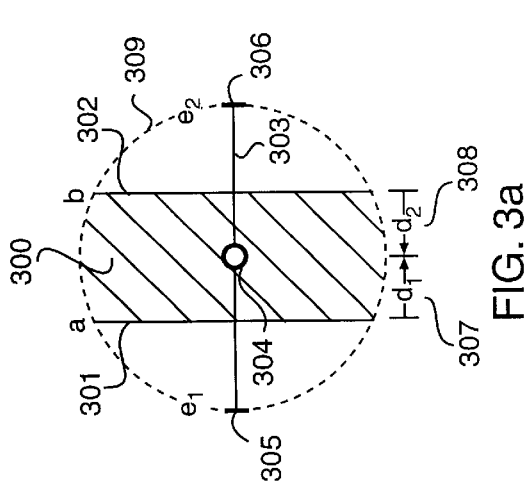
FIG. 3a
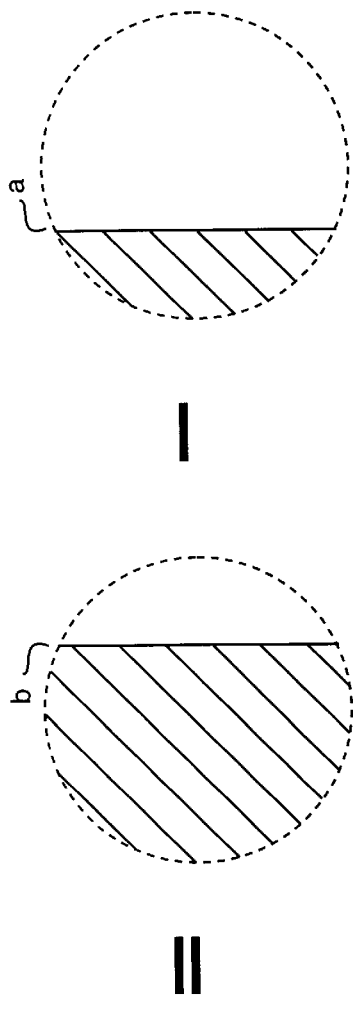
FIG. 3f
FIG. 3e
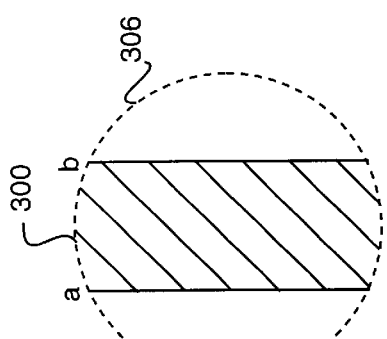
FIG. 3d

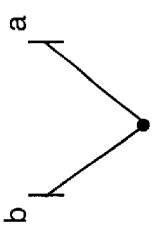
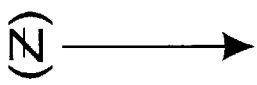
FIG. 5c
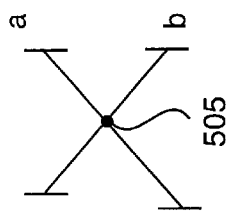
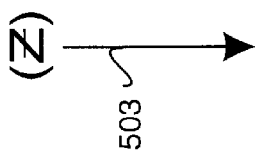
FIG. 5b
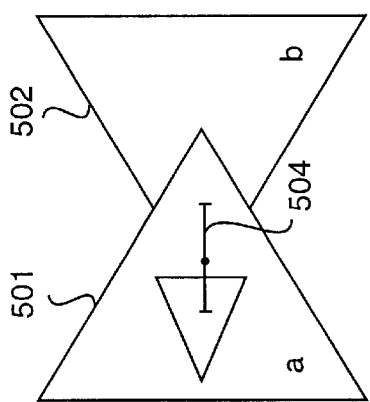
FIG. 5a

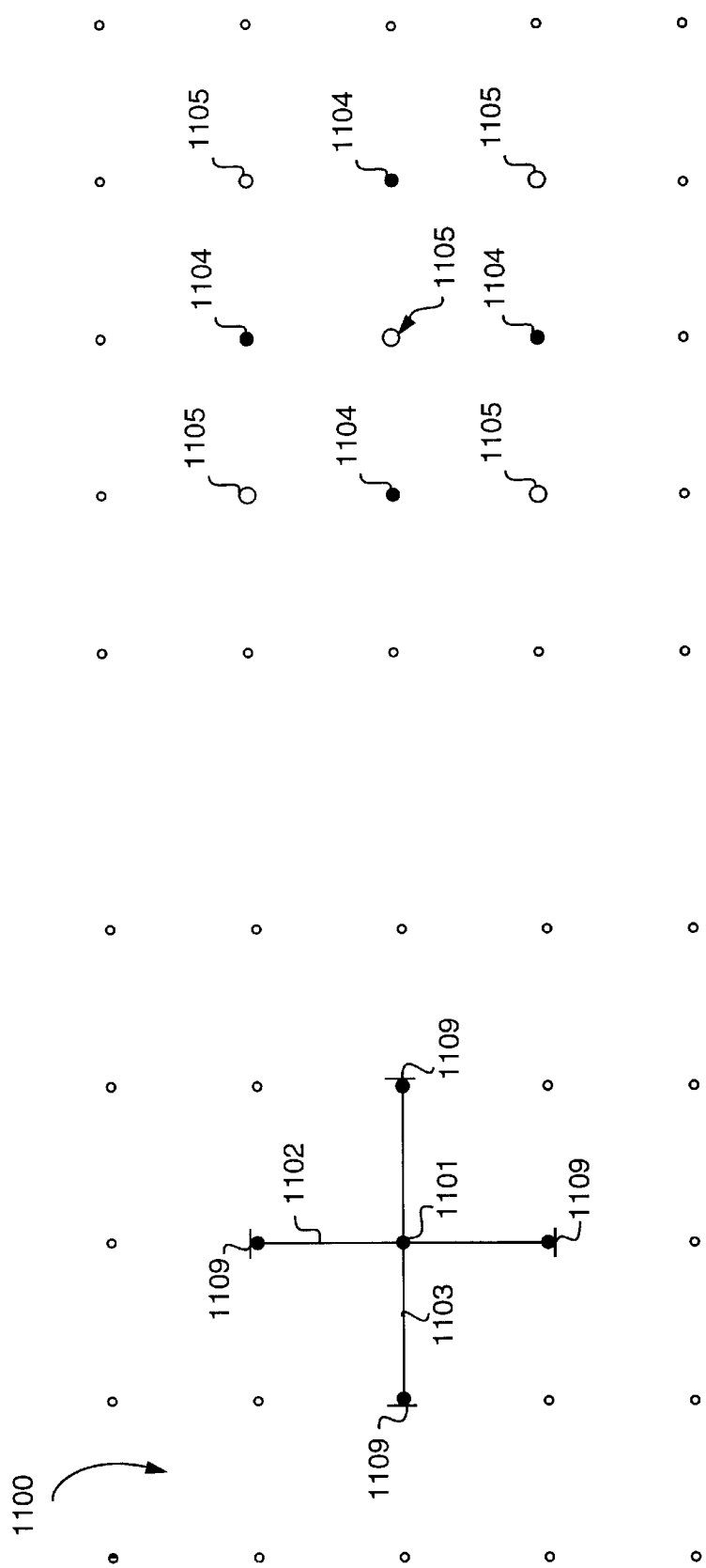

ANTI-ALIASING WITH LINE SAMPLES

FIELD OF THE INVENTION

The present invention relates generally to image processing, and more particularly to removing aliasing effects that occur when sampling a continuous image.

BACKGROUND OF THE INVENTION

There are a wide variety of computer applications which generate images. These applications include games, graphic design, animation, simulation, visualization, modeling, and the like. In these applications, the generated images should be as realistic as possible.

In computer graphics, a generated image is represented as a regular array of discrete samples of a continuous image. This "discrete image" is a result of sampling the continuous image at some fixed and finite rate. The individual sample points are referred to as pixels. It is critical to remember that a pixel is a sampling point, not a rectangular area in the discrete image.

Because the sampling rate is finite, high frequencies present in the continuous image can "alias" as incorrect low frequencies. Some common features in continuous images, such as edges, contain infinitely high frequencies, so any finite sampling rate will invariably lead to aliasing. In computer-generated images, the aliasing appears as stair-stepped contours of image objects, i.e., so called "jaggies." Other aliasing effects can cause moire patterns and the break-up of fine details.

Anti-aliasing is used to improve the appearance of discrete images. Anti-aliasing is accomplished by computing and sampling a convolution of the continuous image with some frequency-limiting filter. The pixels are samples of the filtered version of the continuous image. There are two common methods used to compute the samples of this convolution in the prior art: area sampling and point sampling.

Area Sampling Anti-aliasing

Area sampling anti-aliasing uses a processed but still continuous form of the continuous image to exactly compute the convolution of an anti-aliasing filter function and this continuous image. This convolution is sampled to produce a value to be used while determining a pixel in the discrete image. Typically, the filter function is a Gaussian filter having a radius R. The radius defines the "footprint" or "support" of the filter.

The processed form of the continuous image used by area sampling is usually a set of polygons visible in the filter footprint around each pixel. Unfortunately, in many cases the continuous image is defined by a three-dimensional scene description including geometric objects which can occlude or intersect one another. These occlusions and intersections make it difficult to efficiently process the continuous image into a form suitable for area sampling because complicated shapes can result from the interaction of even simple objects.

Point Sampling Anti-aliasing

Point sampling anti-aliasing uses multiple point sample locations in the vicinity of a pixel. The continuous image is evaluated at points corresponding to the pixel locations, and the resulting values are combined according to some weighting function in an attempt to approximate the convolution of the filter with the continuous image. Point sampling is the most common method used for anti-aliasing because of its simplicity and ease of implementation. Point sampling simplifies the occlusion problem present in area sampling of three-dimensional scenes, but suffers from slow convergence to the correct solution.

In general, N point samples are required to compute the value of a pixel with an accuracy of 1/N. Because the point sample locations are separated from each other and not connected, fine details can be missed entirely in the sampling. Consequently, the missed details fail to contribute to the discrete image.

Combined Point and Area Sampling

Area and point sampling methods are often combined in rendering systems. Area sampling can be applied efficiently to two-dimensional sampled images, such as texture maps, while point sampling is generally used to anti-alias the edges and intersections of polygons. Point sampling is used to generate weighted coverage values (WCVs) for polygons that lie within the filter footprint of some pixel, which are then associated with that pixel. A WCV is the result of the convolution of the visible portion of a polygon with the anti-aliasing filter at a pixel that weights the color contribution of that polygon to the color of that pixel. An area sampling method is used to produce colors for the polygons, which are also associated with that pixel. The WCVs and colors associated with that pixel are then combined to produce the final color for the pixel in the discrete image.

Other Anti-aliasing Method

Max, in "Anti-aliasing Scan-Line Data," IEEE Computer Graphics & Applications, 10(1): 18–30, January 1990, describes a hybrid method. His hybrid method provides continuous anti-aliasing in one direction, by approximating area sampling, while using supersampling to anti-alias the other direction. Edges that run substantially parallel to the continuous direction are anti-aliased less effectively than edges that are substantially perpendicular to the continuous direction.

Accordingly, there are numerous drawbacks and disadvantages of prior art area and point sampling anti-aliasing methods. Therefore, there is a need to provide an improved anti-aliasing method without a large increase in memory or a decrease in drawing speed while generating discrete images.

SUMMARY OF THE INVENTION

The invention provides a method that uses a filter function to generate an anti-aliased discrete image sampled from a continuous image including an edge. The method defines a line sample. A progressive convolution is derived from the filter function and the line sample. A pixel at a predetermined location in the discrete image is selected, and the line sample is oriented with respect to the selected pixel.

A distance is measured from a point in the continuous image corresponding to the selected pixel to the edge along the oriented line sample. The progressive convolution is evaluated at the measured distance to produce a weighted coverage value, and the weighted coverage value is associated with the pixel to anti-alias the pixel in the discrete image.

In one aspect of the invention, only visible edges are anti-aliased, and only pixels within a predetermined distance from the edge are considered, for example, the distance is less than or equal to a length of the line sample.

In another aspect of the invention, the line sample is straight, centered on the pixel, and substantially perpendicular to the edge.

In yet another aspect of the invention, the filter function is a Gaussian function, and the progressive convolution is a cumulative integral of the filter function for various distances. The progressive convolution can be defined by a continuous function, or alternatively, the values of the progressive convolution are stored in a table for a finite number of distances.

In yet another aspect of the invention, multiple line samples are defined for each pixel and the weighted coverage values of the line samples are combined to produce a combined weighted coverage value which is associated with the pixel.

BRIEF DESCRIPTION OF THE DRAWINGS

FIG. 3a is a diagram of a line sample intersecting two edges of an object;

FIG. 3b is a graph showing segment information;

FIG. 3c is a graph showing a difference of two evaluations of the progressive convolution;

FIGS. 3d–3f are diagrams of the difference between two coverage evaluations;

FIGS. 5a–5c are diagrams of line sampling intersecting objects;

FIGS. 11a–11b are diagrams of line sampling data generation at pixel grid positions;

DETAILED DESCRIPTION OF PREFERRED EMBODIMENTS

The present invention uses line samples to provide an improved method for generating weighted coverage values (WCVs) that can be used to anti-alias a discrete image. The WCVs are the result of a convolution of a visible portion of a polygon with an anti-aliasing filter at a pixel that weights the color contribution of that polygon to the color of that pixel.

Line sampling according to the invention lies between area and point sampling methods of the prior art in terms of efficiency and accuracy. The line sampling method of the present invention can be used for calculating WCVs from shape information, i.e., edges, occlusions and intersections, and can be combined with area sampling of shade information, i.e., color and texture as in the prior art. Therefore, the present invention enables the production of high quality anti-aliased images.

The key insights underlying line sampling rely on the following properties. The convolution of a finite filter and a straight edge can be efficiently and accurately determined given the intersection of the edge with a line sample at least spanning the footprint of the filter having an orientation substantially perpendicular to that edge. In addition, occlusion and intersection determinations are much simpler to perform on line samples than on area samples. This is true because these interactions produce less complicated primitives. In addition, occlusions can be resolved for large sections of a line sample with a single calculation. These properties give line sampling better convergence than point sampling, and accuracy similar to area sampling but at a lower computational cost.

Efficiently computing convolutions with line samples requires deriving a progressive convolution (PC) from the desired filter function. If the desired filter function is radially symmetric, then a single PC suffices for all line sample orientations. Otherwise, a PC must be determined for each possible line sample orientation, or at a sufficient number of separate orientations to allow interpolation at other, intermediate orientations. The determination of a PC according to the invention is shown in FIGS. 1 and 2.

As shown diagrammatically in FIG. 1, a pixel 100 is located at various distances, e.g., −1.5, −0.8, 0.0, +0.8, and +1.5, from an edge 101 of a graphic object 104 with a shaded interior. A footprint of a filter function, see FIG. 1f, centered at the pixel is indicated by a circle 102. The footprint is the "support" of the filter function, i.e., the area where the filter function has non-zero values.

Figure 1F:
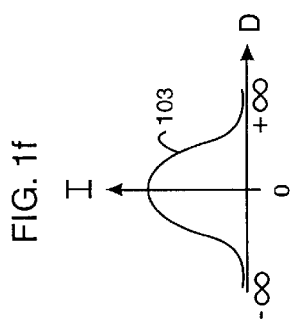
FIG. 1f is a graph of a filter function.
Figure 1E:
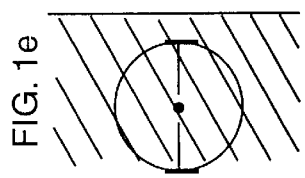
FIGS. 1a–1e are diagrams of a filter footprint for line samples centered on a pixel at various distances to an edge of a graphic object.
Figure 1D:
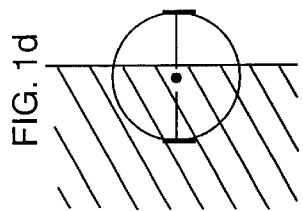
Figure 1C:
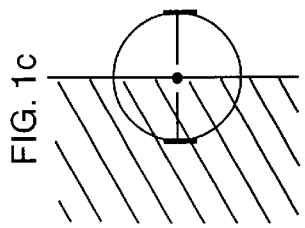
Figure 1B:
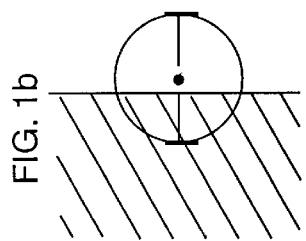
Figure 1A:
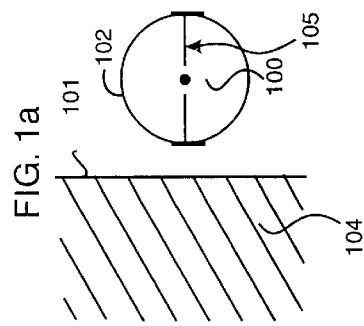
Figure 2:
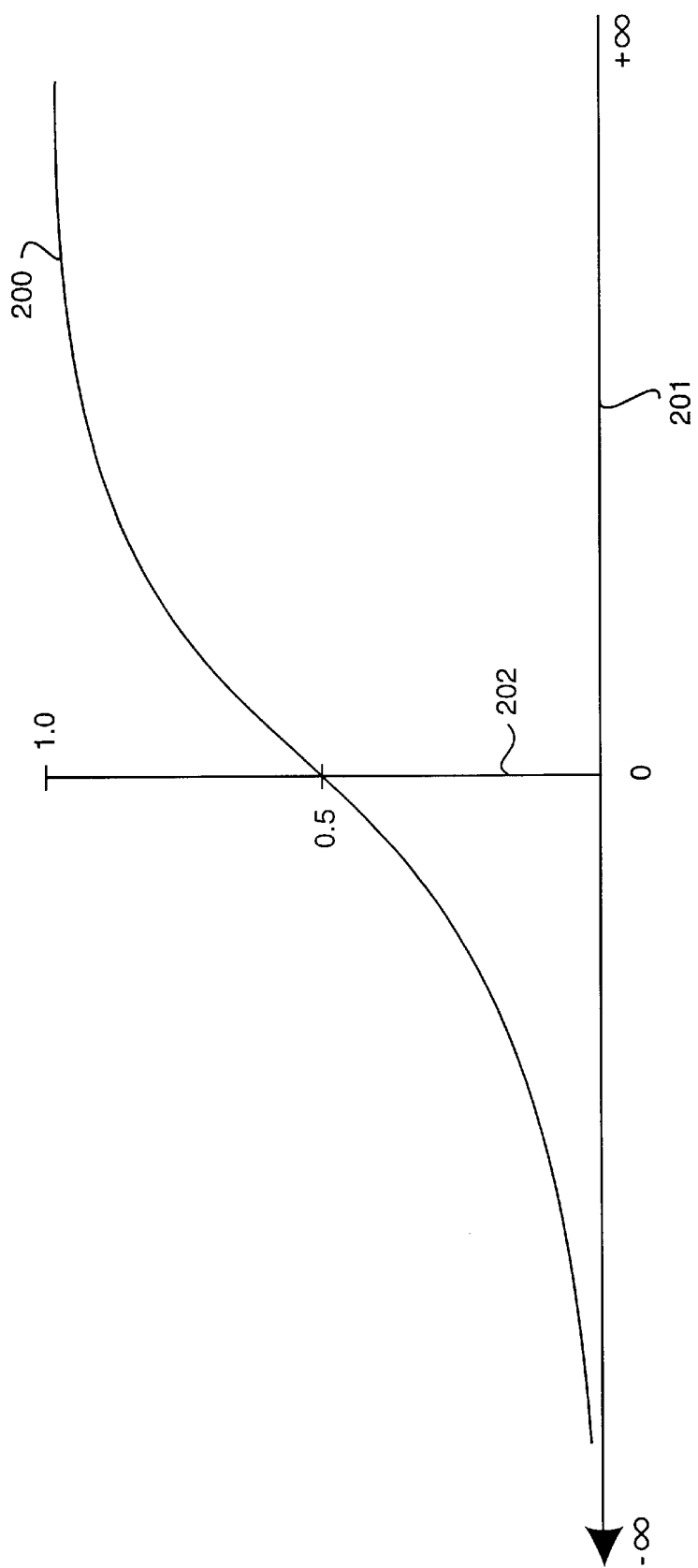
FIG. 2 is a graph of a progressive convolution.

The graph 103 of FIG. 1f is an example Gaussian filter function that represents the values produced by the filter with the x-axis indicating the distance from the pixel, and the y-axis the intensity (I) of the function. It should be understood that other filter functions can be used by the present invention.

The pixel and edge are shown at multiple distances from each other. The line segment 105 represents a line sample according to the invention. Preferably, the line sample is straight and centered on the pixel, the orientation of the line sample is selected to be perpendicular to the edge 101, and the length of the line sample 105 at least spans the diameter of the footprint 102.

It should be understood that the line sample can have other linear configurations, for example, a circle, a Bezier curve, etc. It should also be understood that the line sample can have other positions, lengths and orientations. The placement of the line sample can be off-center, or near the pixel when this is computationally advantageous.

FIG. 2 shows a PC 200 derived from the filter function 103. Distances for pixels outside the object are indicated by negative numbers, the distance of a pixel on the edge of the object is zero, and distances for pixels inside the object are positive. The distances are shown along the x-axis 201. The weighted coverage values of the PC are along the y-axis 202. The WCVs are in the range 0.0 to 1.0. For example, if the pixel is located on the edge, then the WCV of the PC is 0.5 indicating half coverage of the filter footprint 102 by the edge 101. When the filter footprint is located entirely inside the object there is full coverage, and there is no coverage when the filter footprint is entirely outside the object. The value of the PC 200 decreases from 0.5 to zero as the pixel moves away from the edge, and increases from 0.5 to one as the pixel moves in the opposite direction. Full coverage represents the area under the curve 103 of FIG. 1*f*. Essentially, the progressive convolution according to the invention expresses cumulative integrals of the filter function for various distances from the edge.

The PC 200 derived from the filter 103 convoluted with the edge 101 can be efficiently evaluated. If the filter is simple, then the PC 200 can be functionally evaluated as needed. When the filter is complex, some subset of the values of the PC 200 at varying distances from the edge can be precomputed and stored in a table for interpolation at intermediate distances. In a tabular form, the PC is indexed by the distance, and intermediate values can be interpolated. Although the PC 200 of FIG. 2 shows WCVs for all possible distances, i.e., from negative infinity to positive infinity, it should be understood that in a practical application, the WCV varies only over a very small range of distances, i.e., −2.0 to +2.0, where one unit is equal to the spacing between pixels.

If the filter is radially asymmetric, then PCs can be generated for each line sample orientation. However, in practice, most commonly used filters have a simple structure and are radially symmetric, which obviates the need for tables and allows a single PC to suffice for all line sample orientations.

FIGS. 3*a–f* show how a desired convolution of an object and a PC for a desired filter can be efficiently and accurately determined with a line sample according to the invention. An object 300 has edges a, b 301–302. A line sample 303 is centered on a pixel 304 located between the edges a,b 301–302. The line sample 303 has endpoints e1 305 and e2 306. The desired convolution is the WCV for the object 300 at the pixel 304. The line sample 303 spans the filter footprint 309. As shown, the line sample 303 is oriented substantially perpendicular to the multiple edges a, b. The distances $d_1$ 307 and $d_2$ 308 indicate respectively the relative distances between the pixel and edges a and b along the line sample 303.

The graph 310 of FIG. 3*b* shows segment information for the intersection of the object 300 with the line sample 303. The relative positions of the edge intersections along the line sample determine a segment 320 on the line sample bounded by the two distances $d_1$ and $d_2$. The exact convolution of the interior of the object 300 with the filter 306, shown in FIG. 3*d*, can be evaluated as the difference in the convolution of the filter with edge b, as shown in FIG. 3*e* and the convolution of the filter with edge a as shown in FIG. 3*f*. As shown in FIG. 3*c*, this difference is equivalent to the difference 331 between the values of the PC 330 evaluated at $d_2$ and $d_1$. This difference is exactly the WCV for the object 300 at the pixel 304.

The extension of the method shown in FIG. 3 to more than two edges would be obvious to one of ordinary skill in the art.

Figure 4C:
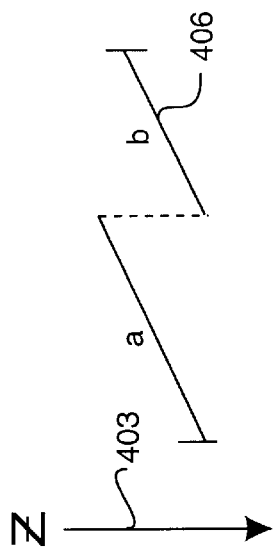
FIGS. 4a–4c are diagrams of line sampling occluding objects.
Figure 4B:
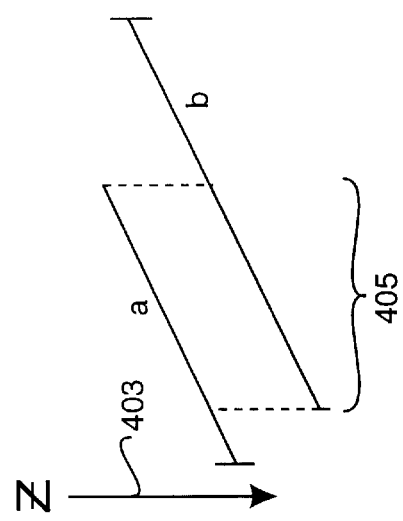

Occlusion and intersection of multiple polygons can produce very complex shapes when some polygons partially occlude or intersect each other. This is true even with simple polygons such as triangles. Determining the anti-aliasing convolution along a line sample, rather than for an area sample of the prior art, simplifies the problem significantly for occlusion as shown in FIGS. 4*a*–4*c*, and for intersection as shown in FIGS. 5*a*–5*c*.

Figure 4A:
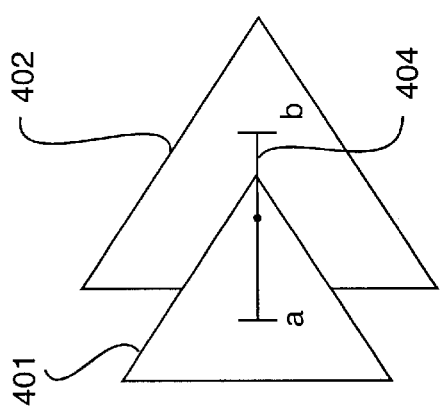

In FIG. 4*a*, a polygon a 401 partially occludes a polygon b 402. FIG. 4*b* shows example depth information (Z) 403 along a line sample 404 for the segments corresponding to polygons a, b. Where the line sample overlaps both a and b, occlusion occurs. This occlusion can be resolved by comparing the depth information at all points on the line sample and retaining only the information for the segment with the smallest depth at each point, and discarding the information for the segment with the largest depth at each point. Along line samples, occlusion can be resolved for entire sections of segments efficiently. Such occlusion might truncate or split existing segments. FIG. 4*c* shows the result of the occlusion of a and b along the line sample 404. The occlusion for an entire section 405 in 4*b* has been resolved by selectively retaining and discarding, leaving the remainder 406 in FIG. 4*c*.

FIG. 5*a* shows polygons a 501 and b 502 intersecting each other. FIG. 5*b* shows depth information (Z) 503 along a line sample 504 for the segments corresponding to polygons a, b. The intersection of the two polygons results in a corresponding intersection 505 in the depth information for the corresponding segments. This intersection can be located and used to resolve the mutual occlusion of a and b by selective retaining and discarding based on depth information as described above. The intersection of segments might also truncate or split existing segments as above. The result of this intersection and occlusion is shown in FIG. 5*c*.

Line sampling provides a more accurate determination of the anti-aliasing filter convolution than point sampling. For instance, N point samples provide accuracy proportional to roughly 1/N. A line sample oriented perpendicular to an edge calculates the convolution for that edge with perfect accuracy, and with reasonable accuracy when the line sample and edge are oriented substantially perpendicular to each other.

Figure 6B:
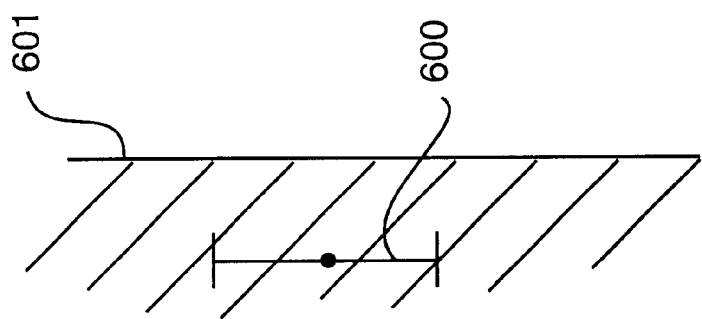
FIGS. 6a–6b are diagrams of a line sample oriented parallel to an edge.
Figure 6A:
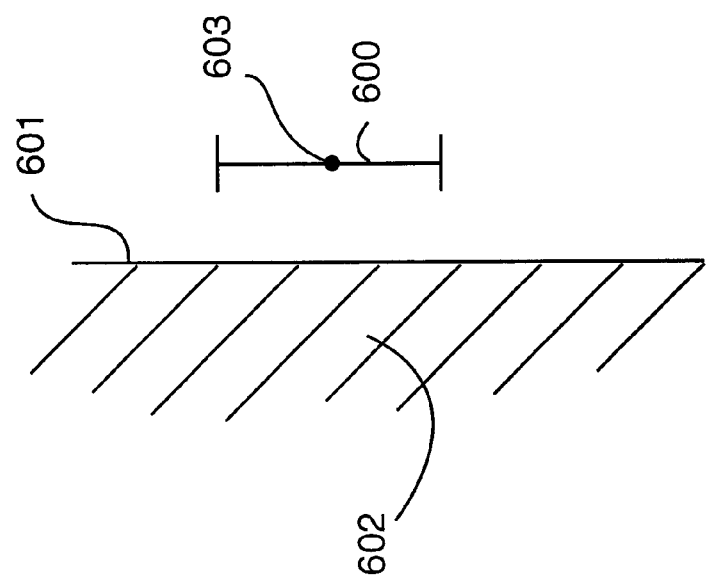

If the line sample and the edge are oriented parallel to each other, then the line sample acts as a single point sample as shown in FIGS. 6*a* and 6*b*. In the FIG. 6*a*, a line sample 600 is centered on a pixel 603, and oriented parallel to an edge 601 of an object 602. Here, there is no coverage between the line sample and the object (WCV=0). A slight change in the position of the edge, i.e., as soon as the object covers the line sample, causes a drastic change in the appearance from no coverage to full coverage (WCV=1) as shown in FIG. 6*b*.

For this reason, it is beneficial to either take multiple line samples with different orientations and combine their resulting WCVs, or to choose the orientation of line samples depending on the orientation of edges in the continuous image.

Using multiple line samples requires a method for weighting the contributions of the individual line samples. One method weights the contributions equally, averaging the values from the line samples to produce the end result. Better approximations of the convolution are generated by weighting the line samples based on some measure of how well they are oriented for sampling the edges in the underlying continuous image as described below.

It is possible to determine the convolution with sufficient accuracy for edges of any orientation with two line samples that are perpendicular to each other. The weights for the contribution of each sample can then be determined based on several criteria. The relative orientation of each edge and the line samples that intersect that edge can be considered. The number of edges that intersect each line sample can be a factor. The variance, or other statistical measure, of the visible segments of the line sample can be used.

Figure 7B:
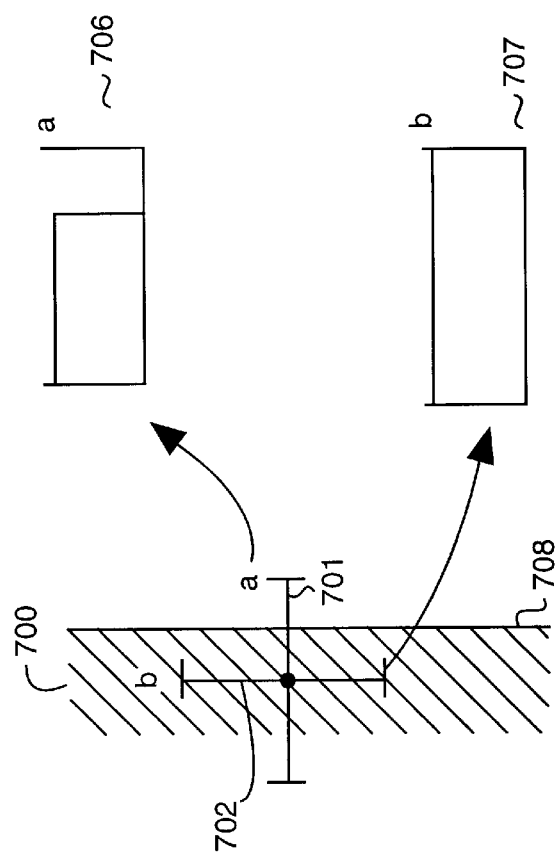
FIGS. 7a–7b are diagrams of line sampling using two orthogonal line samples.
Figure 7A:
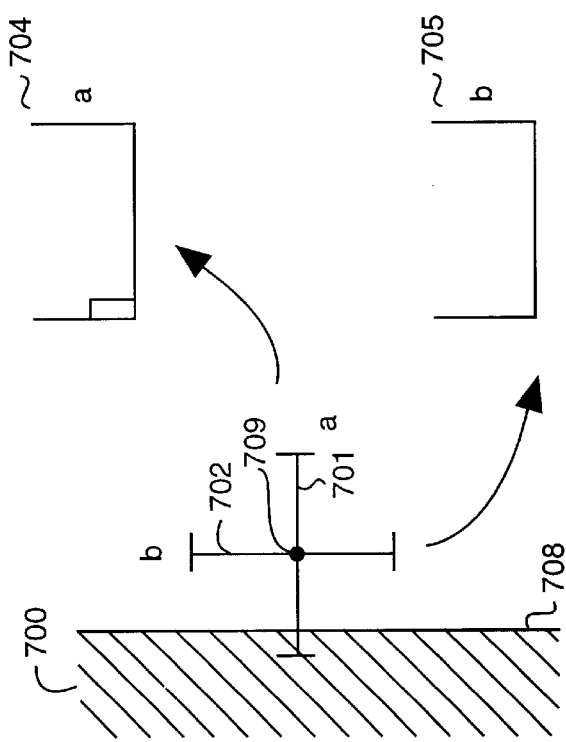

In FIG. 7a, two line samples 701 and 702 for a pixel 709 are arranged perpendicular to each other. Line sample 701 partially intersects an object 700, and line sample 702 is completely outside the object. The segment information corresponding to object 700 for the line samples 701 and 702 is respectively shown in graphs 704 and 705. In FIG. 7b, the object 700 has moved relative to the line samples 701 and 702. Line sample 702 is entirely within the object 700, and a larger portion of line sample 701 intersects object 700.

The respective segment information is shown in graphs 706 and 707. The edge 708 is anti-aliased more accurately by the line sample 701 because of its perpendicular orientation to the edge. The line samples 701 and 702 compute two WCVs for the object 700 at the pixel 709. Because the edge 708 is anti-aliased more accurately by line sample 701, the computed WCV from line sample 701 should contribute more to the combined WCV for object 700 at pixel 709 than the WCV computed by line sample 702.

Figure 8:
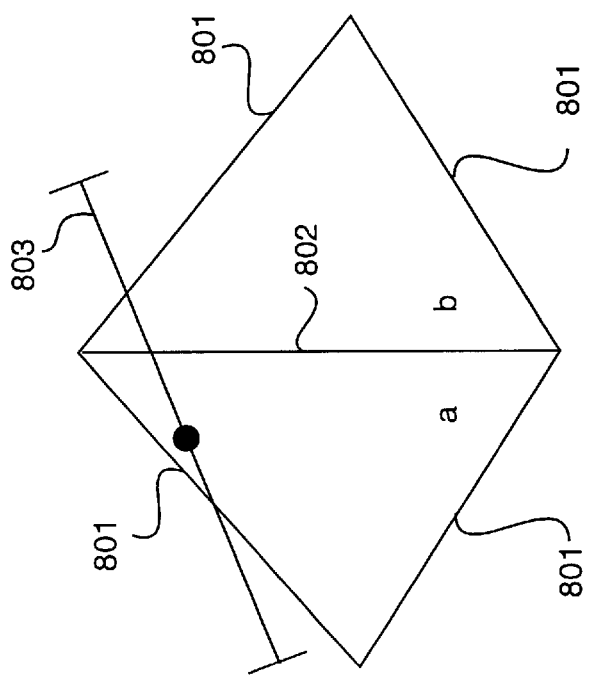
FIG. 8 is a diagram of line sampling visible and non-visible edges of adjoining objects.

As shown in FIG. 8, it is useful to limit the consideration of edges affecting sample weights along a line sample 803 only to those edges that are "visible." Visible edges 801 are the edges that are produced by the edge of a polygon not matched (in, for example, color) by another polygon (of the same color), or an occlusion, or an intersection. An edge 802 that occurs where two polygons of the same color join is not as likely to be visible in the generated image, and therefore should be treated as "non-visible" to prevent those edges from affecting the weighting of line samples that intersect them. For instance, an object made up of multiple adjoining polygons should have the edges making up its silhouette anti-aliased according to the orientation of those silhouette edges without the interior edges between polygons affecting the result.

Figure 9:
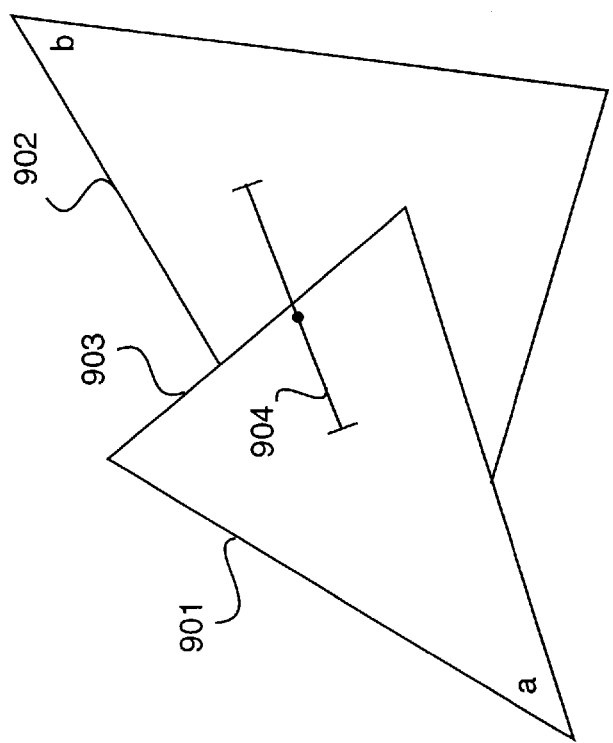
FIG. 9 is a diagram of line sampling visible and non-visible edges of occluding objects.

FIG. 9 shows a polygon a 901 partially occluding another polygon b 902. An edge 903 of polygon 901 is not matched by an edge of polygon 902. The edge 903 is visible in the discrete image, and should affect the anti-aliasing calculation. Therefore, edge 903 should be treated as a visible edge for the purposes of calculating sample weights using line sample 904.

Figure 10B:
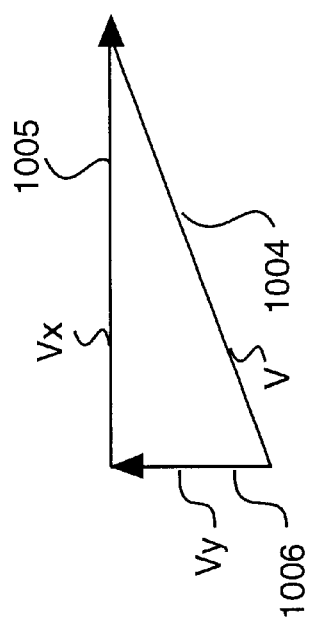
FIGS. 10a–10b are diagrams of weighting multiple line samples for line sampling according to a normalized edge vector.
Figure 10A:
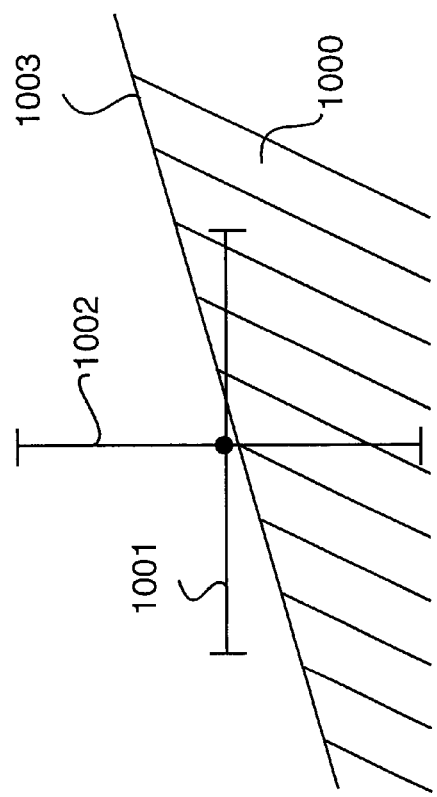

FIG. 10a shows how weights can be determined for two perpendicular, axis-aligned line samples 1001 and 1002 near an edge 1003 of an object 1000. Here, the orientation of the edge 1003 is not perpendicular to either line sample 1001–1002. A vector running along the edge 1003 can be calculated. FIG. 10b shows edge vector 1004 for the edge 1003, with a horizontal component $V_x$ 1005 and a vertical component $V_y$ 1006.

The method first determines the normalized vector ($V_{nx}$, $V_{ny}$) for each visible edge that intersects either of the line samples. Then, for a normalized edge vector with components ($V_{nx}$, $V_{ny}$), add $V_{nx}^2$ to the total weight of the vertical sample, and add $V_{ny}^2$ to the total weight of the horizontal sample. The squares of the values of the components are used to keep the total contribution of any edge equal to unity. After all of the contributions of the relevant edges have been weighted, the relative weights of the vertical and horizontal line samples can be determined, and the relative weights are used to blend the WCVs of the two line samples. The blending can use any suitable blending function, such as linear blending, cubic blending, or the selection of the WCV with greater weight.

As shown in FIG. 11a, it is possible to use conventional rasterization techniques to speed up line sample evaluation for two perpendicular, axis-aligned line samples. In FIG. 11a, it is desired to sample at pixel 1101 of a pixel grid 1100 with line samples 1102 and 1103. When using an anti-aliasing filter with a radius equal to the distance between pixels, which is a common choice, fast rasterization techniques currently used for point sampling can also be used to generate edge distance values at the line sample endpoints 1109, which lie exactly on pixel grid locations. The edge distance value for a line sample endpoint and an edge is defined as the shortest distance between the line sample endpoint and that edge.

As shown in FIG. 11b, the "solid" pixels 1104 are used, and the "open" pixels 1105 are not used for the line samples 1102 and 1103. Pineda arithmetic can be used to efficiently generate the edge distance values for polygons in the image at the line sample endpoints, see Pineda, "A Parallel Algorithm for Polygon Rasterization," Proceedings of SIGGRAPH, Computer Graphics, Vol.22. NO.4, pp. 17–20, 1988. Since these edge distance values vary linearly in the image, segments for line samples can be efficiently generated using basic geometric or algebraic methods (e.g., similar triangles) given only the edge distance values at the endpoints of the line samples. Segments are the portion of the line sample where the edge distance values are all positive.

Line samples can be generated for entire rows and columns of pixels in the discrete image using conventional scan-line rasterization techniques. Using these techniques, all visible segments on a line spanning the entire continuous image can be generated. A line sample for a pixel, with the same orientation as the line spanning the entire continuous image, is then generated by considering the portion of the visible segments within the filter footprint of the pixel.

Figure 12:
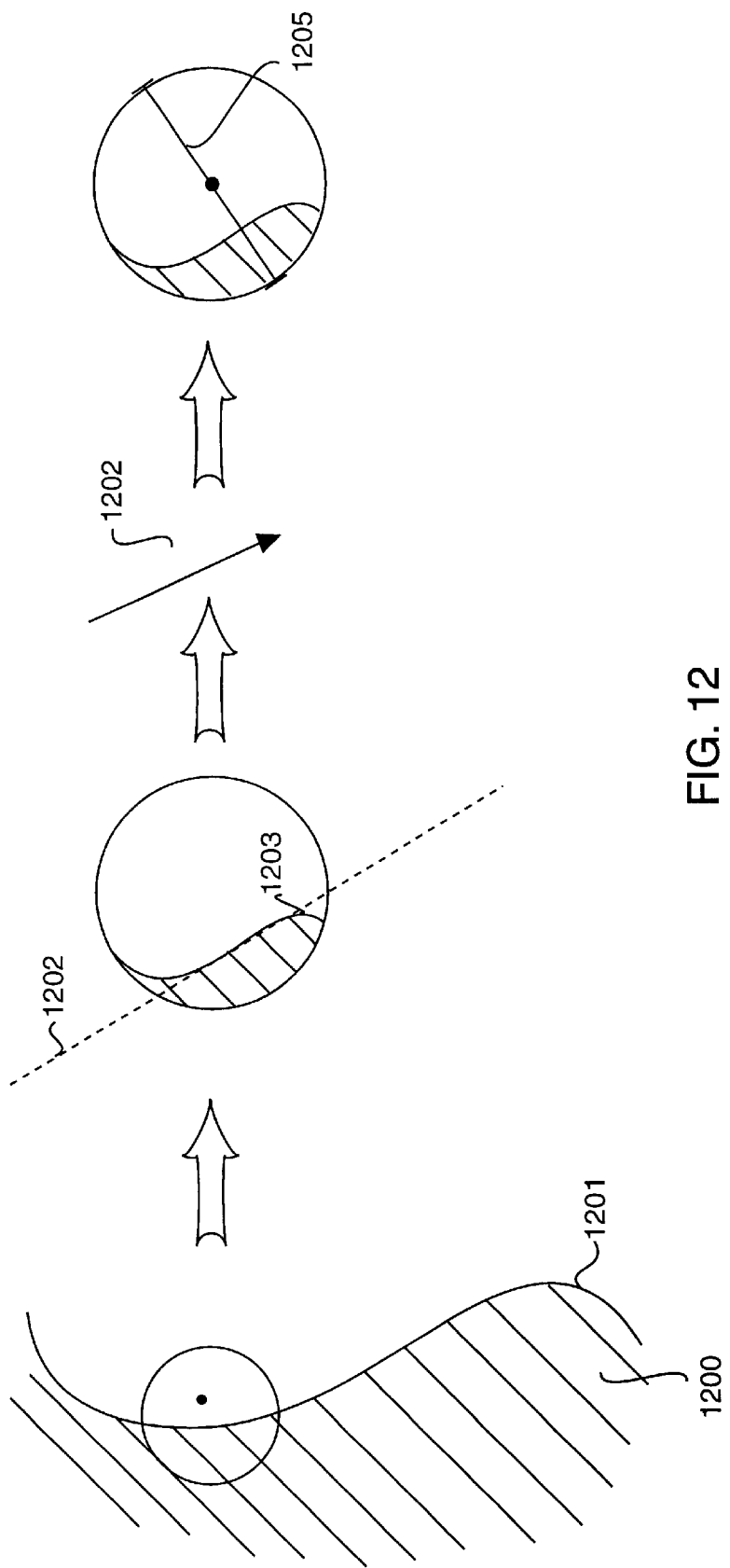
FIG. 12 is a diagram of line sampling a bounding curve with an orientation perpendicular to a tangential direction.

If information about the edges in the underlying continuous image is known, then a single line sample per pixel with the correct orientation is sufficient to properly generate WCVs for pixels sampling that image. The edge information can be taken from the continuous image itself. For example as shown in FIG. 12, many objects 1200, e.g., fonts, are specified by bounding curves 1201. Tangent information 1202 for a curve 1203 can be computed from the curve description. Line sample 1205 is oriented perpendicularly to the direction of the tangent 1202.

Figure 13:
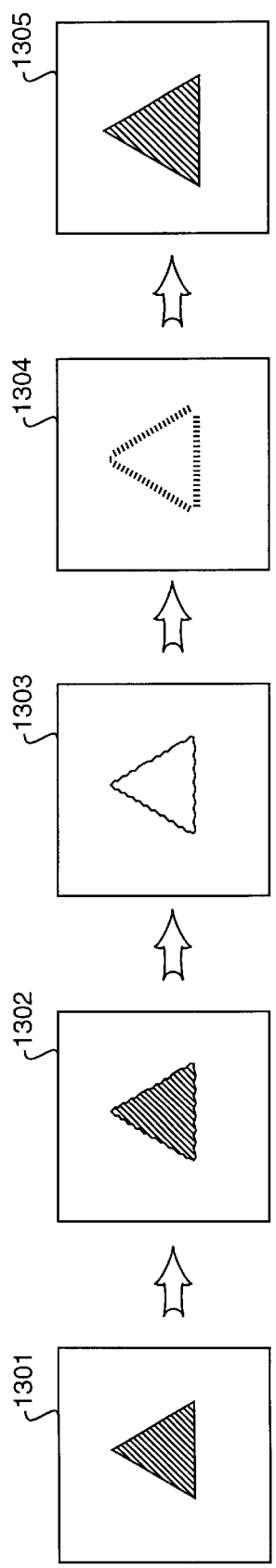
FIG. 13 is a diagram of line sampling using a low resolution image and edge detection.

In an alternative method shown in FIG. 13, a low resolution point sampled image 1302 is generated from a continuous image 1301. The low resolution image 1302 is processed with an edge detection operator to generate edge information 1303. The detected edges 1303 indicate orientations of appropriate line samples 1304. The properly oriented line samples are then applied to the continuous image to produce the WCVs used to generate an anti-aliased discrete image 1305.

While this invention has been described in terms of a preferred embodiment and various modifications thereof for several different applications, it will be apparent to persons of ordinary skill in this art, based on the foregoing description together with the drawing, that other modifications may also be made within the scope of this invention, particularly in view of the flexibility and adaptability of the invention whose actual scope is set forth in the following claims.

We claim:

1. A method for anti-aliasing a discrete image generated from a continuous image using a filter function, the continuous image including an edge, comprising the steps of:

defining a line sample;

deriving a progressive convolution from the filter function and the line sample;

selecting a pixel at a predetermined location in the discrete image;

orienting the line sample with respect to the selected pixel;

measuring a distance from a point in the continuous image corresponding to the selected pixel to the edge along the oriented line sample;

evaluating the progressive convolution at the measured distance to produce a weighted coverage value;

associating the weighted coverage value with the pixel to anti-alias the pixel in the discrete image.

2. The method of claim 1 wherein the edge is visible.

3. The method of claim 1 wherein the selected pixel is within a predetermined distance from the edge.

4. The method of claim 3 wherein the predetermined distance is less than or equal to a length of the line sample.

5. The method of claim 1 wherein the line sample is straight.

6. The method of claim 1 wherein the line sample is substantially centered on the pixel and substantially perpendicular to the edge.

7. The method of claim 1 wherein the line sample has a finite length that at least spans a footprint of the filter function.

8. The method of claim 1 wherein the filter function is a Gaussian function.

9. The method of claim 1 wherein the progressive convolution is a cumulative integral of the filter function at various distances.

10. The method of claim 1 wherein the progressive convolution is defined by a continuous function.

11. The method of claim 1 wherein the values of the progressive convolution are stored in a table for a finite number of distances.

12. The method of claim 1 wherein the continuous image includes first and second edges, and further comprising the steps of:

measuring a first and second distance from a point in the continuous image corresponding to the selected pixel to the first and second edges;

evaluating the progressive convolution at the measured first and second distances to produce first and second weighted coverage values;

associating a difference of the first and second weighted coverage values with the pixel to anti-alias the pixel in the discrete image.

13. The method of claim 1 wherein the edge in the continuous image results from a first object interacting with a second object, and the selected pixel has a first depth information for the first object and a second depth information for the second object, and further comprising the steps of:

determining sections of the line sample that interact;

selectively retaining and discarding sections based on the depth information of the sections.

14. The method of claim 13 wherein the first and second objects interact by occluding.

15. The method of claim 13 wherein the first and second objects interact by intersecting.

16. The method of claim 1 further comprising the steps of defining a first line sample, and a second line sample;

deriving a first progressive convolution from the filter function and the first line sample;

deriving a second progressive convolution from the filter function and the second line sample;

selecting a pixel at a predetermined location in the discrete image;

orienting the first and second line samples with respect to the selected pixel;

measuring a first and second distance from a point in the continuous image corresponding to the selected pixel to the edge along the oriented first and second line samples;

evaluating the first progressive convolution of the first line sample and the second progressive convolution of the second line sample at the measured first and second distances to produce a first weighted coverage value and a second weighted coverage value;

weighting the first and second line samples;

blending the first and second weighted coverage values according to the weighting of the first and second line samples;

associating the blended weighted coverage values with the pixel to anti-alias the pixel in the discrete image.

17. The method of claim 16 wherein the first line sample is perpendicular to the second line sample.

18. The method of claim 16 wherein the first and second line samples are evaluated and weighted according to the orientation of the first and second line samples with respect to the edge.

19. The method of claim 18 wherein the weighting uses a normalized vector derived from the edge.

20. The method of claim 16 wherein the lengths of the first and second line samples are twice a distance between pixels of the discrete image, and the edge distance values are generated at the line sample endpoints.

21. The method of claim 16 further comprising the steps of selecting rows and columns of pixels;

selecting a line spanning the entire continuous image aligned with the rows and columns of pixels;

generating segment information for the line spanning the entire continuous image;

determining visible segments for the line spanning the entire continuous image;

selecting a pixel in the rows and columns of pixels;

generating a line sample for the pixel from the visible segments within a footprint of the filter function at the pixel.

22. The method of claim 1 wherein the edge is a curve, further comprising the steps of:

determining a tangent to the curve; and orienting the line sample perpendicular to the tangent.

23. The method of claim 1 further comprising the steps of:

generating a low resolution image of the continuous image;

applying an edge detector operator on the low resolution image to generate the edge;

orienting the line sample perpendicular to the edge.

* * * * *